US012111270B2

(12) United States Patent
Oh et al.

(10) Patent No.: US 12,111,270 B2
(45) Date of Patent: Oct. 8, 2024

(54) METHOD OF INSPECTING A WAFER AND APPARATUS FOR PERFORMING THE SAME

(71) Applicant: Samsung Electronics Co., Ltd., Suwon-si (KR)

(72) Inventors: Juntaek Oh, Hwaseong-si (KR); Jinwoo Ahn, Yongin-si (KR); Kijoo Hong, Seoul (KR); Youngkyu Park, Incheon (KR); Eunsoo Hwang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 35 days.

(21) Appl. No.: 17/725,917

(22) Filed: Apr. 21, 2022

(65) Prior Publication Data

US 2023/0104399 A1    Apr. 6, 2023

(30) Foreign Application Priority Data

Oct. 5, 2021   (KR) .................. 10-2021-0131368

(51) Int. Cl.
*G01N 21/95* (2006.01)
*G01N 21/21* (2006.01)
*G01N 21/55* (2014.01)

(52) U.S. Cl.
CPC ......... *G01N 21/9501* (2013.01); *G01N 21/21* (2013.01); *G01N 21/55* (2013.01); *G01N 2201/121* (2013.01)

(58) Field of Classification Search
CPC .... G01N 21/9501; G01N 21/21; G01N 21/55; G01N 2201/121; G01N 21/31; G01N 21/93; G01N 21/274; G01N 2201/127; G01N 21/8806; H01L 22/12
See application file for complete search history.

(56) References Cited

U.S. PATENT DOCUMENTS

| | | | |
|---|---|---|---|
| 7,106,425 B1 * | 9/2006 | Bultman | G01N 21/9501 356/73 |
| 7,397,205 B2 | 7/2008 | Huang et al. | |
| 8,126,677 B2 * | 2/2012 | De Groot | G01B 11/0675 702/158 |
| 9,354,165 B2 * | 5/2016 | Simpkin | G01N 21/359 |
| 9,539,840 B2 | 1/2017 | Richter | |
| 9,865,447 B2 | 1/2018 | Chuang et al. | |
| 10,007,208 B2 | 6/2018 | Kawana et al. | |
| 10,088,413 B2 | 10/2018 | Kwak et al. | |
| 10,685,594 B2 | 6/2020 | Henry et al. | |
| 11,112,304 B2 | 9/2021 | Ishizaki et al. | |

(Continued)

FOREIGN PATENT DOCUMENTS

KR   101591490 B1   2/2016

*Primary Examiner* — Edmond C Lau
*Assistant Examiner* — Joshua M Carlson
(74) *Attorney, Agent, or Firm* — Muir Patent Law, PLLC

(57) ABSTRACT

A method of inspecting a wafer comprising measuring an intensity of an incident light and storing the measurement as stored incident light intensity, irradiating the incident light to the wafer, measuring an intensity of a reflected light from the wafer and storing the measurement as stored reflected light intensity, and correcting the stored reflected light intensity based on a difference between the stored incident light intensity and a reference intensity of a reference incident light.

17 Claims, 6 Drawing Sheets

(56) References Cited

U.S. PATENT DOCUMENTS

| | | | |
|---|---|---|---|
| 2014/0264052 A1* | 9/2014 | Son | H01L 22/12 |
| | | | 250/372 |
| 2018/0130667 A1* | 5/2018 | Kimba | B24B 49/12 |
| 2018/0224334 A1* | 8/2018 | O'Rourke | G01N 21/274 |
| 2021/0082725 A1* | 3/2021 | Jung | G02B 27/30 |
| 2021/0295495 A1* | 9/2021 | Li | H01L 21/67288 |
| 2023/0204509 A1* | 6/2023 | Shimono | G01N 21/65 |
| | | | 356/318 |

* cited by examiner

METHOD OF INSPECTING A WAFER AND APPARATUS FOR PERFORMING THE SAME

CROSS-RELATED APPLICATION

This application claims priority under 35 USC § 119 to Korean Patent Application No. 10-2021-0131368, filed on Oct. 5, 2021 in the Korean Intellectual Property Office (KIPO), the contents of which are herein incorporated by reference in their entirety.

BACKGROUND

1. Field

Example embodiments relate to a method of inspecting a wafer and an apparatus for performing the same. More particularly, example embodiments relate to a method of inspecting a wafer using a light and an apparatus for performing the method.

2. Description of the Related Art

Generally, a wafer may be inspected using a light including multiple wavelengths. For example, the light includes multiple wavelengths along the electromagnetic spectrum. In an inspection apparatus and inspection method, the light may be irradiated to the wafer. A light reflected from the wafer (i.e., a reflected light), in response to the light irradiated to the wafer, may be detected. The reflected light may include information of the wafer. Thus, the wafer may be inspected from the reflected light.

According to related arts, the light may be generated from a broadband plasma light sources that utilizes a laser and plasma. The light generated form the laser and plasma may be referred to as broadband light in that it includes multiple wavelengths along the electromagnetic spectrum. A fluctuation may be generated in the laser and/or the plasma in accordance with a time lapse. The fluctuation of the laser and/or the plasma may change an intensity of the light. As used herein, the intensity of light or light intensity may refer to the amount of radiation present. The changed intensity of the light may reduce reliability of an inspection result.

SUMMARY

Example embodiments provide a method of inspecting a wafer having improved inspection reliability.

Example embodiments also provide an apparatus for performing the above-mentioned method.

According to example embodiments, there may be provided a method of inspecting a wafer, the method comprising measuring an intensity of an incident light and storing the measurement as stored incident light intensity, irradiating the incident light to the wafer, measuring an intensity of a reflected light from the wafer and storing the measurement as stored reflected light intensity, and correcting the stored reflected light intensity based on a difference between the stored incident light intensity and a reference intensity of a reference incident light.

According to example embodiments, there may be provided a method of inspecting a wafer, the method comprising measuring an intensity of an incident light having multiple wavelengths and storing the measurement as stored incident light intensity, polarizing the incident light, irradiating the polarized incident light to the wafer, measuring an intensity of a reflected light from the wafer and storing the measurement as stored reflected light intensity, and correcting the stored reflected light intensity based on a difference between the stored reflected light intensity and a reference intensity of a reference incident light.

According to example embodiments, there may be provided an apparatus for inspecting a wafer, the apparatus comprising a light source configured to generate an incident light for inspecting the wafer, a first calibrator configured to measure an intensity of the incident light, a second calibrator configured to measure an intensity of a reflected light from the wafer, and a corrector configured to receive the measured intensity of the incident light and the measured intensity of the reflected light, store the measured intensity of the incident light as stored incident light intensity and the measured intensity of the reflected light as stored reflected light intensity, and correct the stored reflected light intensity based on a difference between the stored incident light intensity and a reference intensity of a reference incident light.

According to example embodiments, when the difference between the intensity of the incident light and the reference intensity of the reference light may be generated, the difference may mean that a fluctuation may be generated in the intensities of the incident light. The intensity of the reflected light may be corrected based on the difference to improve inspection reliability of the wafer.

BRIEF DESCRIPTION OF THE DRAWINGS

Example embodiments will be more clearly understood from the following detailed description taken in conjunction with the accompanying drawings.

FIG. 1 is a block diagram illustrating an apparatus for inspecting a wafer in accordance with example embodiments;

FIG. 2 is a flow chart illustrating a method of inspecting a wafer using the apparatus in FIG. 1;

FIG. 3 is a block diagram illustrating an apparatus for inspecting a wafer in accordance with example embodiments;

FIG. 4 is a flow chart illustrating a method of inspecting a wafer using the apparatus in FIG. 3;

FIG. 5 is a block diagram illustrating an apparatus for inspecting a wafer in accordance with example embodiments; and FIG. 6 is a flow chart illustrating a method of inspecting a wafer using the apparatus in FIG. 5.

DETAILED DESCRIPTION OF THE EMBODIMENTS

Hereinafter, example embodiments will be explained in detail with reference to the accompanying drawings.

Figure 1:
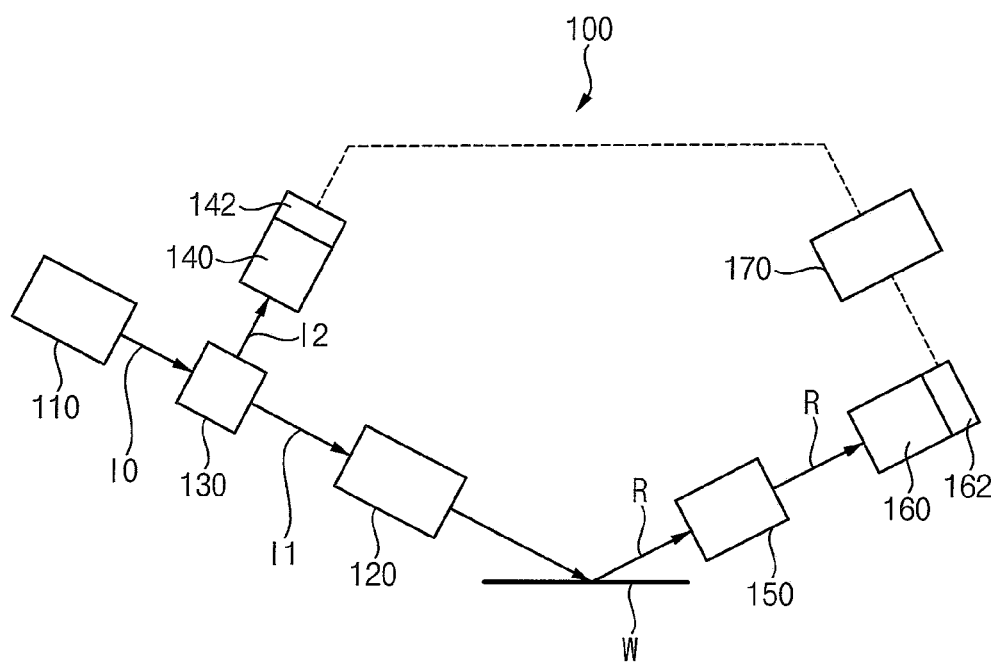
FIGS. 1 to 6 represent non-limiting, example embodiments as described herein.

FIG. 1 is a block diagram illustrating an apparatus for inspecting a wafer in accordance with example embodiments.

Referring to FIG. 1, an apparatus 100 for inspecting a wafer in accordance with example embodiments may include a light source 110, a polarization state generator (PSG) 120, a beam splitter 130, a first spectrometer 140, a first calibrator 142, a polarization state analyzer (PSA) 150, a second spectrometer 160, a second calibrator 162 and a corrector 170.

The light source 110 may generate an incident light I0 for inspecting the wafer W. The light source 110 may be positioned over a left portion of the wafer W, not limited thereto. In example embodiments, the light source 110 may be a broadband light source and the incident light I0 may include multiple wavelengths.

The PSG 120 may be arranged between the light source 110 and the wafer W. The PSG 120 may include a polarizer, a compensator, etc. The PSG 120 may polarize the incident light I0 to provide the incident light I0 with optical characteristics coincided with inspection conditions of the wafer W.

The beam splitter 130 may be arranged between the light source 110 and the PSG 120. The beam splitter 130 may split the incident light I0 into a first split light I1 and a second split light I2. The first split light I1 may be irradiated to the wafer W through the PSG 120.

The second split light I2 may be incident to the first spectrometer 140. The first spectrometer 140 may divide the second split light I2 by wavelengths. The first spectrometer 140 may include the first calibrator 142. For example, the first calibrator 142 may be arranged in the first spectrometer 140. The first calibrator 142 may include an area sensor, not limited thereto.

The first calibrator 142 may measure intensities of the second split light I2 by the wavelengths (e.g., measure the intensity of each wavelength of the split light I2, or measuring intensity, such as average intensity according to ranges of wavelengths). For example, the second split light I2 may be divided for measurement purposes into a plurality of wavelength ranges, and for each range, an intensity or average intensity of light across the range may be determined. The light intensity may be measured, for example, in terms of known light intensity measurement values (e.g., lux, etc.). Because the second split light I2 may be divided from the incident light I0, the intensities of the second split light I2 by the wavelengths measured by the first calibrator 142 may correspond to intensities of the incident light I0 by the wavelengths. Further, the first calibrator 142 may measure intensities of a reference incident light by wavelengths. The reference incident light may have reference intensities by the wavelengths set in inspecting the wafer W. The intensities of the incident light I0 by the wavelengths and the reference intensities of the reference incident light by the wavelengths measured by the first calibrator 142 may be transmitted to the corrector 170.

The first split light I1 split from the incident light I0 may have intensities by the wavelengths substantially the same as the intensities of the second split light I2 by the wavelengths. The first split light I1 may then be irradiated to the wafer W. The first split light I1 may be reflected from the wafer W to form a reflected light R.

The reflected light R may be incident to the PSA 150. The PSA 150 may include a polarizer, a compensator, etc. The PSA 150 may analyze the reflected light R. Particularly, the PSA 150 may polarize the reflected light R to provide the reflected light R with readable state of polarization.

The reflected light R passing through the PSA 150 may be incident to the second spectrometer 160. The second spectrometer 160 may divide the reflected light R by wavelengths. The second spectrometer 160 may include the second calibrator 162. For example, the second calibrator 162 may be arranged in the second spectrometer 160. The second calibrator 162 may include an area sensor, not limited thereto.

The second calibrator 162 may measure intensities of the reflected light R by the wavelengths. The reflected light R from the wafer W may include information of the wafer W, for example, information with respect to a profile of a pattern on the wafer W. Thus, the intensities of the reflected light R by the wavelengths may represent the information of the wafer W. For example, an image of the wafer W may be obtained from the measured intensities of the reflected light R by the wavelengths.

Further, the second calibrator 162 may measure intensities of a reference reflected light by the wavelengths. Because the reference reflected light may be formed from the reference incident light incident to the wafer W, the reference reflected light may have reference intensities by the wavelengths set in inspecting the wafer W. The intensities of the reflected light R by the wavelengths and the reference intensities of the reference reflected light by the wavelengths measured by the second calibrator 162 may be transmitted to the corrector 170.

The corrector 170 may be a computer or a computer system configured to receive data, store data and executional instructions, and execute functions based on the stored data and/or the executional instructions. Although not illustrated, the corrector 170 may include one or more storage devices and one or more processors. The storage devices may include conventional memory of a computer, such as a hard drive (which may be a solid state drive, DRAM, NAND flash memory, etc.). The processors may include a CPU (Central Processing Unit), GPU (graphics processor), digital signal processor (DSP), a field-programmable gate array (FPGA), etc. The corrector 170 may receive, from the first calibrator 142, the intensities of the incident light I0 by the wavelengths and the reference intensities of the reference incident light by the wavelengths measured by the first calibrator 142. The corrector 170 may also receive, from the second calibrator 162, the intensities of the reflected light R by the wavelengths and the reference intensities of the reference reflected light by the wavelengths measured by the second calibrator 162. The corrector 170 may further store the intensities of the incident light I0 by the wavelengths and the reference intensities of the reference incident light by the wavelengths measured by the first calibrator 142 and the intensities of the reflected light R by the wavelengths and the reference intensities of the reference reflected light by the wavelengths measured by the second calibrator 162 in one or more of the storage devices. For example, the corrector 170 may store the intensities of the incident light I0 by the wavelengths as stored incident light intensity and store the intensities of the reflected light R by the wavelengths as stored reflected light intensity. The corrector 170 may correct (e.g., adjust) the intensities of the stored reflected light R by the wavelengths. For example, when the intensities of the reflected light R by the wavelengths are represented by an image, the corrector 170 may correct grey levels on the image.

Particularly, the corrector 170 may compare the intensities of the incident light I0 by the wavelengths with the reference intensities of the reference incident light by the wavelengths. When a fluctuation is not generated in the incident light I0 in accordance with a time lapse, the intensities of the incident light I0 by the wavelengths measured by the first calibrator 142 may be substantially the same as the reference intensities of the reference incident light by the wavelengths. In contrast, when the fluctuation is generated in the incident light I0 in accordance with the time lapse, the intensities of the incident light I0 by the wavelengths measured by the first calibrator 142 may be different from the reference intensities of the reference incident light by the wavelengths. The intensities difference may be shown as a spectrum change. The corrector 170 may calculate the difference between the intensities of the incident light I0 by the wavelengths and the reference intensities of the reference incident light by the wavelengths.

Further, the corrector 170 may compare the intensities of the reflected light R by the wavelengths with the reference intensities of the reference reflected light by the wavelengths. When the fluctuation is not generated in the incident light I0 in accordance with the time lapse, the reflected light R may have optical characteristics substantially the same as optical characteristics of the reference reflected light. Thus, the intensities of the reflected light R by the wavelengths measured by the second calibrator 162 may be substantially the same as the reference intensities of the reference reflected light by the wavelengths. In contrast, when the fluctuation is generated in the incident light I0 in accordance with the time lapse, the optical characteristics of the reflected light R may be different from the optical characteristics of the reference reflected light. Thus, the intensities of the reflected light R by the wavelengths measured by the second calibrator 162 may be different from the reference intensities of the reference reflected light by the wavelengths. The corrector 170 may calculate the difference between the intensities of the reflected light R by the wavelengths and the reference intensities of the reference reflected light by the wavelengths.

In example embodiments, the corrector 170 may correct the intensities of the reflected light R by the wavelengths by the following manners. The corrector 170 may calculate the difference between the intensity of the incident light I0 and the reference intensity of the reference incident light. The corrector 170 may calculate a ratio of the intensity of the reflected light R with respect to the intensity of the incident light I0. The corrector 170 may multiply the ratio by the difference between the intensity of the incident light I0 and the reference intensity of the reference incident light to obtain the difference between the intensities of the reflected light R by the wavelengths and the reference intensities of the reference reflected light by the wavelengths. The corrector 170 may add the difference between the intensities of the reflected light R by the wavelengths and the reference intensities of the reference reflected light by the wavelengths to the intensities of the reflected light R by the wavelengths to correct the intensities of the reflected light R by the wavelengths.

Figure 2:
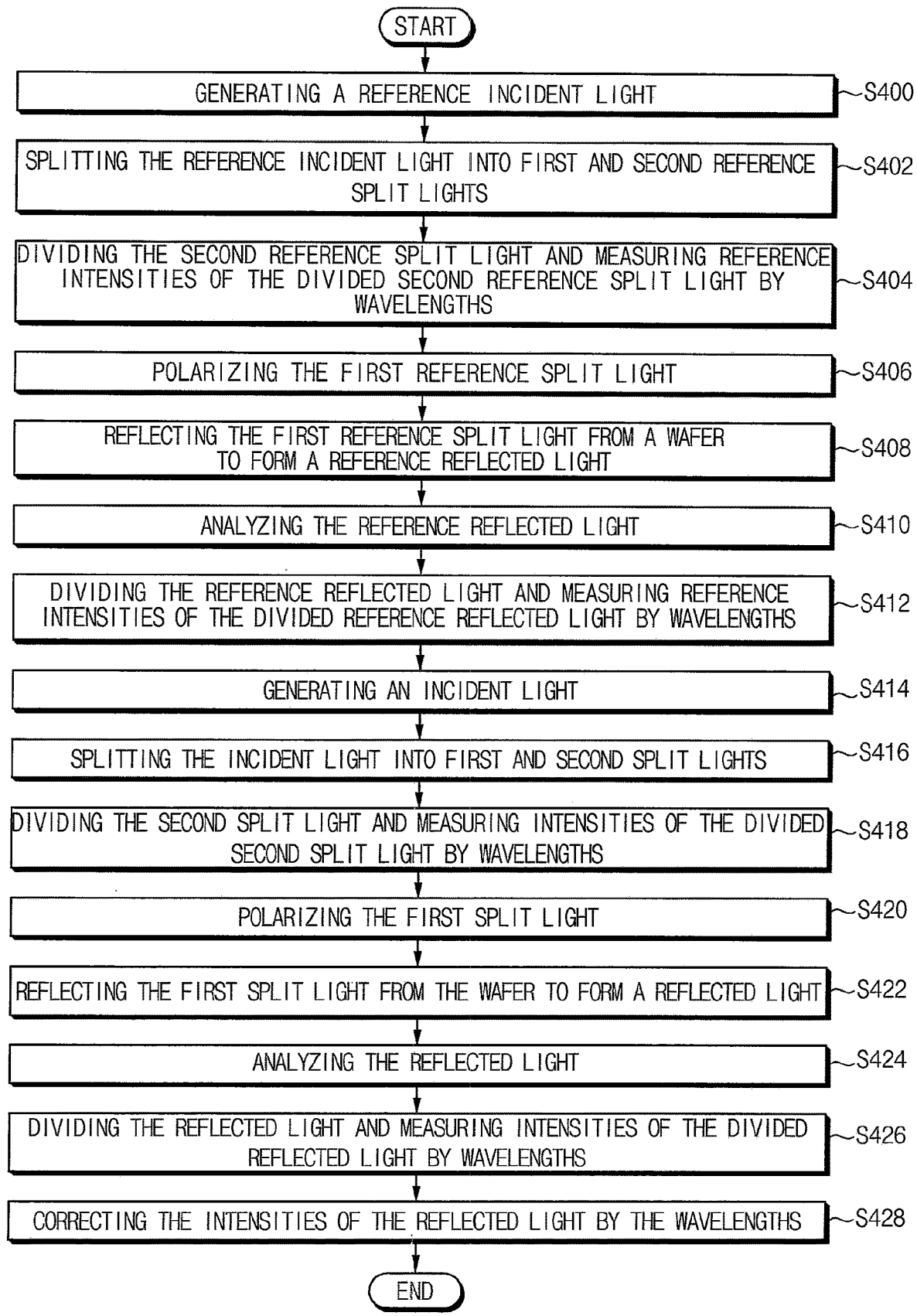

FIG. 2 is a flow chart illustrating a method of inspecting a wafer using the apparatus in FIG. 1.

Referring to FIGS. 1 and 2, in step S400, the light source 110 may generate the reference incident light having a reference intensity $S_0$.

In step S402, the beam splitter 130 may split the reference incident light into a first reference split light and a second reference split light. The first reference split light may be incident to the PSG 120. The second reference split light may be incident to the first spectrometer 140.

In step S404, the first spectrometer 140 may divide the second reference split light. The first calibrator 142 may measure reference intensities $X_0$ of the second reference split light by wavelengths. The reference intensities $X_0$ of the second reference split light by the wavelengths measured by the first calibrator 142 may then be transmitted to the corrector 170.

In step S406, the PSG 120 may polarize the first reference incident light to provide the first reference incident light with optical characteristics coincided with the inspection conditions of the wafer W.

In step S408, the first reference split light may be incident to the wafer W. The first reference split light may be reflected from the wafer W to form the reference reflected light. The reference reflected light may have the reference intensity $Y_0$.

In step S410, the PSA 150 may analyze the reference reflected light.

In step S412, the second spectrometer 150 may divide the reference reflected light. The second calibrator 162 may measure the reference intensities $Y_0$ of the reference reflected light by the wavelengths. The measured reference intensities $Y_0$ of the reference reflected light by the wavelengths may then be transmitted to the corrector 170.

After a time elapse, the light source 110 may be fluctuated (e.g., an intensity of the light source 110 may be fluctuated). In this case, in step S414, the light source 110 may generate the incident light I0. The incident light I0 may have the intensity $S_1$ different from the reference intensity $S_0$ of the reflected incident light.

In step S416, the beam splitter 130 may split the incident light I0 into the first split light I1 and the second split light I2. The first split light may be incident to the PSG 120. The second split light may be incident to the first spectrometer 140.

In step S418, the first spectrometer 140 may divide the second split light I2. The first calibrator 142 may measure the intensities $X_1$ of the second split light I2 by wavelengths. The intensities $X_1$ of the second split light I2 by the wavelengths measured by the first calibrator 142 may then be transmitted to the corrector 170.

In step S420, the PSG 120 may polarize the first incident light I1 to provide the first incident light I1 with optical characteristics coincided with the inspection conditions of the wafer W.

In step S422, the first split light I1 may be incident to the wafer W. The first split light I1 may be reflected from the wafer W to form the reflected light R. The reflected light R may have the intensity $Y_1$ different from the reference intensity $Y_0$ of the reference reflected light.

In step S424, the PSA 150 may analyze the reflected light R.

In step S426, the second spectrometer 150 may divide the reflected light R. The second calibrator 162 may measure the intensities $Y_1$ of the reflected light R by the wavelengths. The measured intensities $Y_1$ of the reflected light R by the wavelengths may then be transmitted to the corrector 170.

In step S428, the corrector 170 may compare the intensities $X_1$ of the second split light I2 by the wavelengths with the reference intensities $X_0$ of the reference incident light by the wavelengths to obtain the difference $\Delta X$ between the intensities $X_1$ of the second split light I2 by the wavelengths and the reference intensities $X_0$ of the reference incident light by the wavelengths. Further, the corrector 170 may compare the intensities $Y_1$ of the reflected light R by the wavelengths with the reference intensities $Y_0$ of the reference reflected light by the wavelengths to obtain the difference $\Delta Y$ between the intensities $Y_1$ of the reflected light R by the wavelengths and the reference intensities $Y_0$ of the reference reflected light by the wavelengths.

The reference intensity $S_0$ of the reference incident light, the reference intensities $X_0$ of the second reference split light by the wavelengths, the reference intensity $Y_0$ of the reference reflected light, the intensity $S_1$ of the incident light I0, the intensities $X_1$ of the second split light I2 by the wavelengths and the intensities $Y_1$ of the reflected light R by the wavelengths may be represented by following formulae.

$$X_0/S_0 = X_1/S_0(1+f1), f1=\Delta X/X_0, \Delta X=X_1-X_0$$

$$Y_0/S_0 = Y_1/S_0(1+f2), f2=\Delta Y/Y_0, \Delta Y=Y_1-Y_0$$

$$\Delta Y=(Y_0/X_0)\Delta X, Y_0=(X_0/X_1)Y_1, \Delta Y=(Y_1/X_1)\Delta X$$

A correction value Yc for correcting the intensities of the reflected light R by the wavelengths may be obtained by the following formula prepared from the above formulae.

$$Yc = Y_1 + \Delta Y$$

That is, the corrector 170 may obtain the difference between the intensity $X_1$ of the incident light I0 corresponding to the second split light I2 and the reference intensity $X_0$ of the reference incident light. The corrector 170 may obtain the ratio of the intensity $Y_1$ of the reflected light R with respect to the intensities $X_1$ of the incident light I0. The corrector 170 may multiply the ratio by the difference $\Delta X$ between the intensity $X_1$ of the incident light I0 and the reference intensity $X_0$ of the reference incident light to obtain the difference $\Delta Y$ between the intensities $Y_1$ of the reflected light R by the wavelengths and the reference intensities $Y_0$ of the reference reflected light by the wavelengths. The corrector 170 may add the difference $\Delta Y$ to the intensity $Y_1$ of the reflected light R to correct the intensities of the reflected light R by the wavelengths.

Figure 3:
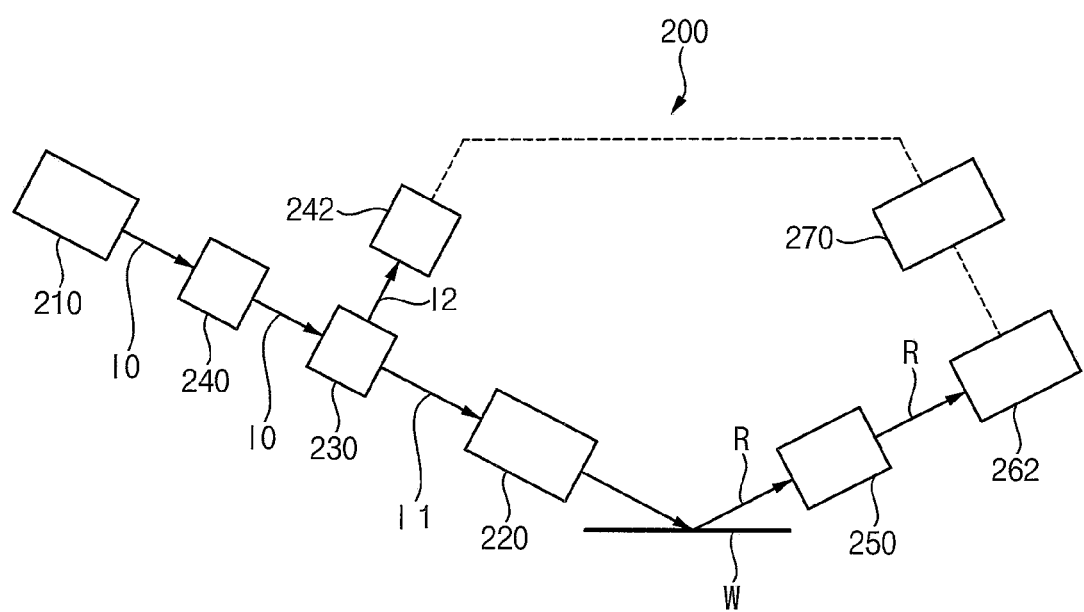

FIG. 3 is a block diagram illustrating an apparatus for inspecting a wafer in accordance with example embodiments.

Referring to FIG. 3, an apparatus 200 for inspecting a wafer in accordance with example embodiments may include a light source 210, a spectrometer 240, a PSG 220, a beam splitter 230, a first calibrator 242, a PSA 250, a second calibrator 262 and a corrector 270.

The light source 210 may generate an incident light I0 for inspecting the wafer W. The light source 110 may be positioned over a left portion of the wafer W, not limited thereto. In example embodiments, the light source 210 may be a broadband light source and the incident light I0 may include multiple wavelengths.

The spectrometer 240 may be arranged between the light source 210 and the wafer W. The spectrometer 240 may divide the incident light I0 into lights by wavelengths.

The PSG 220 may be arranged between the spectrometer 240 and the wafer W. The PSG 220 may include a polarizer, a compensator, etc. The PSG 220 may polarize the incident light I0 to provide the incident light I0 with optical characteristics coincided with inspection conditions of the wafer W.

The beam splitter 230 may be arranged between the spectrometer 240 and the PSG 220. The beam splitter 230 may split the divided incident light I0 into a first split light I1 and a second split light I2. The first split light I1 may be irradiated to the wafer W through the PSG 220.

The second split light I2 may be incident to the first calibrator 242. The first calibrator 242 may measure an intensities of the second split light I2 by the wavelengths. Further, the first calibrator 242 may measure intensities of a reference incident light by the wavelengths. The intensities of the incident light I0 by the wavelengths and the reference intensities of the reference incident light by the wavelengths measured by the first calibrator 242 may be transmitted to the corrector 270.

The first split light I1 may be irradiated to the wafer W. The first split light I1 may be reflected from the wafer W to form a reflected light R. The reflected light R may be incident to the PSA 250. The PSA 250 may include a polarizer, a compensator, etc. The PSA 250 may analyze the reflected light R. Particularly, the PSA 250 may polarize the reflected light R to provide the reflected light R with readable state of polarization.

The reflected light R passing through the PSA 250 may be incident to the second calibrator 262. The second calibrator 262 may measure intensities of the reflected light R by the wavelengths. The reflected light R from the wafer W may include information of the wafer W, for example, information with respect to a profile of a pattern on the wafer W. Thus, the intensities of the reflected light R by the wavelengths may represent the information of the wafer W. For example, an image of the wafer W may be obtained from the intensities of the reflected light R by the wavelengths.

Further, the second calibrator 262 may measure an intensities of a reference reflected light by the wavelengths. Because the reference reflected light may be formed from the reference incident light incident to the wafer W, the reference reflected light may have a reference intensities by the wavelengths set in inspecting the wafer W. The intensities of the reflected light R by the wavelengths and the reference intensities of the reference reflected light by the wavelengths measured by the second calibrator 262 may be transmitted to the corrector 270.

The corrector 270 may correct the intensities of the reflected light R by the wavelengths. The corrector 270 may have functions and a configuration substantially the same as the functions and the configuration of the corrector 170 in FIG. 1. Thus, any further illustrations with respect to the functions and configuration of the corrector 270 may be omitted herein for brevity.

Figure 4:
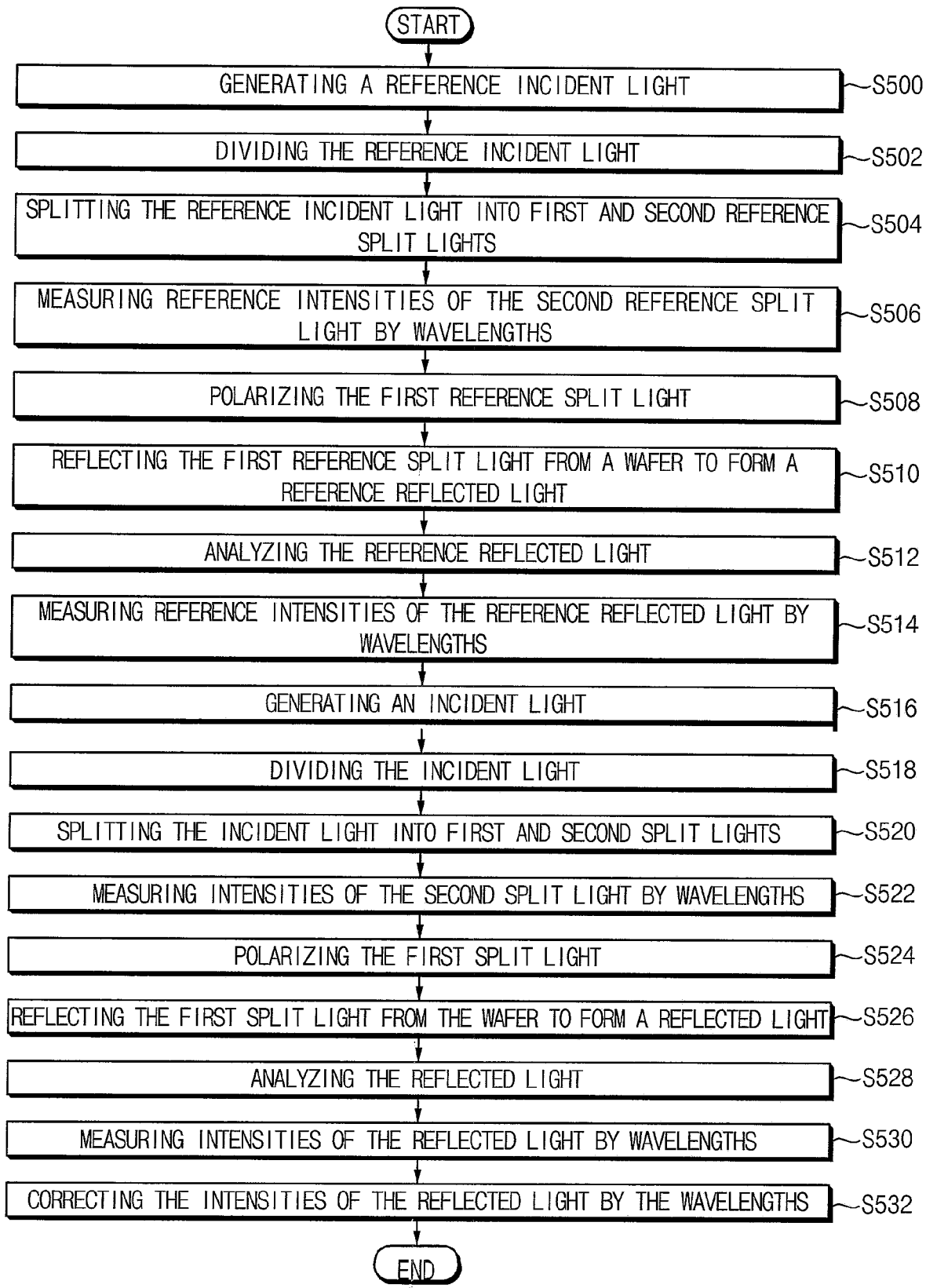

FIG. 4 is a flow chart illustrating a method of inspecting a wafer using the apparatus in FIG. 3.

Referring to FIGS. 3 and 4, in step S500, the light source 210 may generate the reference incident light having a reference intensity.

In step S502, the spectrometer 240 may divide the reference incident light by wavelengths.

In step S504, the beam splitter 230 may split the reference incident light into a first reference split light and a second reference split light. The first reference split light may be incident to the PSG 220. The second reference split light may be incident to the first calibrator 242.

In step S506, the first calibrator 242 may measure reference intensities of the second reference split light by wavelengths. The reference intensities of the second reference split light by the wavelengths measured by the first calibrator 242 may then be transmitted to the corrector 270.

In step S508, the PSG 220 may polarize the first reference incident light to provide the first reference incident light with optical characteristics coincided with the inspection conditions of the wafer W.

In step S510, the first reference split light may be incident to the wafer W. The first reference split light may be reflected from the wafer W to form the reference reflected light. The reference reflected light may have the reference intensities.

In step S512, the PSA 250 may analyze the reference reflected light.

In step S514, the second calibrator 262 may measure the reference intensities of the reference reflected light by the wavelengths. The measured reference intensities of the reference reflected light by the wavelengths may then be transmitted to the corrector 270.

After a time elapse, the light source 210 may be fluctuated. In this case, in step S516, the light source 210 may generate the incident light I0. The incident light I0 may have the intensities different from the reference intensities of the reflected incident light.

In step S518, the spectrometer 240 may divide the incident light I0 by wavelengths.

In step S520, the beam splitter 230 may split the incident light I0 into the first split light I1 and the second split light I2. The first split light I1 may be incident to the PSG 220. The second split light I2 may be incident to the first calibrator 242.

In step S522, the first calibrator 242 may measure the intensities of the second split light I2 by the wavelengths. The intensities of the second split light I2 by the wavelengths measured by the first calibrator 242 may then be transmitted to the corrector 270.

In step S524, the PSG 220 may polarize the first incident light I1 to provide the first incident light I1 with optical characteristics coincided with the inspection conditions of the wafer W.

In step S526, the first split light I1 may be incident to the wafer W. The first split light I1 may be reflected from the wafer W to form the reflected light R. The reflected light R may have the intensities different from the reference intensities of the reference reflected light.

In step S528, the PSA 250 may analyze the reflected light R.

In step S530, the second calibrator 262 may measure the intensities of the reflected light R by the wavelengths. The measured intensities of the reflected light R by the wavelengths may then be transmitted to the corrector 270.

In step S532, the corrector 270 may correct the intensities of the reflected light R by the wavelengths using the reference intensities of the reference incident light by the wavelengths, the reference intensities of the reference reflected light by the wavelengths, the intensities of the second split light I2 by the wavelength and the intensities of the reflected light R. The correcting functions of the corrector 270 may be substantially the same as the correcting functions of the corrector 170 illustrated with reference to FIG. 2. Thus, any further illustrations with respect to the correcting functions of the corrector 270 may be omitted herein for brevity.

Figure 5:
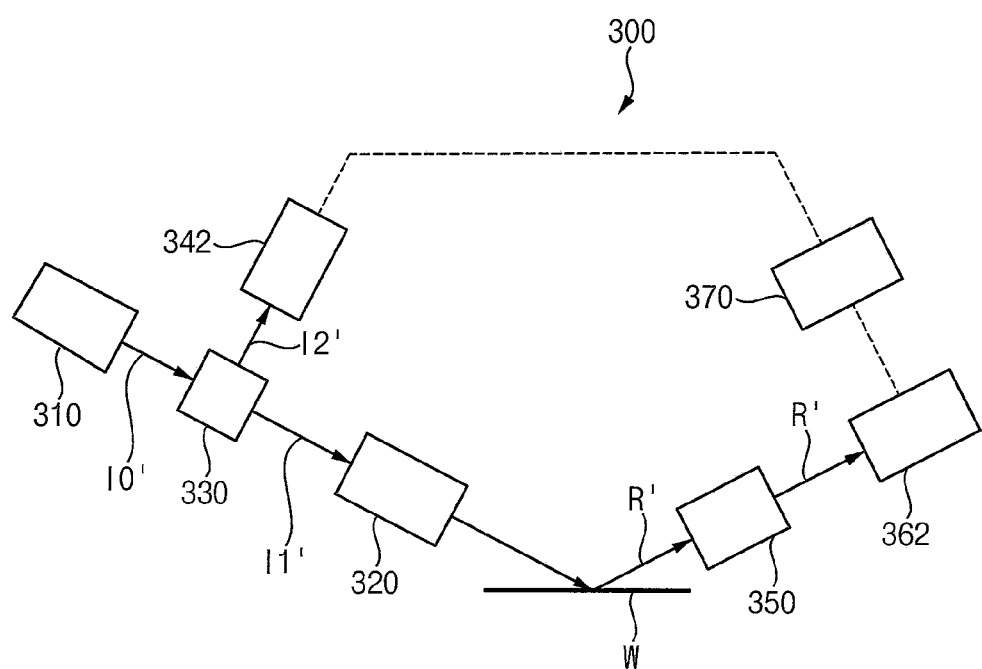

FIG. 5 is a block diagram illustrating an apparatus for inspecting a wafer in accordance with example embodiments.

Referring to FIG. 5, an apparatus 300 for inspecting a wafer in accordance with example embodiments may include a light source 310, a PSG 320, a beam splitter 330, a first calibrator 342, a PSA 350, a second calibrator 362 and a corrector 370.

The light source 310 may generate an incident light I0' for inspecting the wafer W. The light source 310 may be positioned over a left portion of the wafer W, not limited thereto. In example embodiments, the incident light I0' may have a single wavelength. For example, contrary to a broadband light source as discussed above, light source 310 may be a monochromatic light source, such as a single wavelength laser that emits light at one specific wavelength. Thus, the apparatus 300 may not include a spectrometer configured to divide the incident light I0' by wavelengths.

The PSG 320 may be arranged between the light source 310 and the wafer W. The PSG 320 may include a polarizer, a compensator, etc. The PSG 320 may polarize the incident light I0' to provide the incident light I0 with optical characteristics coincided with inspection conditions of the wafer W.

The beam splitter 330 may be arranged between the light source 310 and the PSG 320. The beam splitter 330 may split the divided incident light I0' into a first split light I1' and a second split light I2'. The first split light I1' may be irradiated to the wafer W through the PSG 320.

The second split light I2' may be incident to the first calibrator 342. The first calibrator 342 may measure an intensity of the second split light I2'. Further, the first calibrator 342 may measure an intensity of a reference incident light. The intensity of the incident light I0' and the reference intensity of the reference incident light measured by the first calibrator 342 may be transmitted to the corrector 370.

The first split light I1' may then be irradiated to the wafer W. The first split light I1' may be reflected from the wafer W to form a reflected light R'. The reflected light R' may be incident to the PSA 350. The PSA 350 may include a polarizer, a compensator, etc. The PSA 350 may analyze the reflected light R'. Particularly, the PSA 350 may polarize the reflected light R' to provide the reflected light R' with readable state.

The reflected light R' passing through the PSA 350 may be incident to the second calibrator 362. The second calibrator 362 may measure an intensity of the reflected light R'. The reflected light R' from the wafer W may include information of the wafer W, for example, information with respect to a profile of a pattern on the wafer W. Thus, the intensity of the reflected light R' may represent the information of the wafer W. For example, an image of the wafer W may be obtained from the intensity of the reflected light R'.

Further, the second calibrator 362 may measure an intensity of a reference reflected light. Because the reference reflected light may be formed from the reference incident light incident to the wafer W, the reference reflected light may have a reference intensity set in inspecting the wafer W. The intensity of the reflected light R' and the reference intensity of the reference reflected light by the wavelengths measured by the second calibrator 362 may be transmitted to the corrector 370.

The corrector 370 may correct the intensity of the reflected light R'. The corrector 370 may have functions and a configuration substantially the same as the functions and configuration of the corrector 170 in FIG. 1. Thus, any further illustrations with respect to the functions and configuration of the corrector 370 may be omitted herein for brevity.

Figure 6:
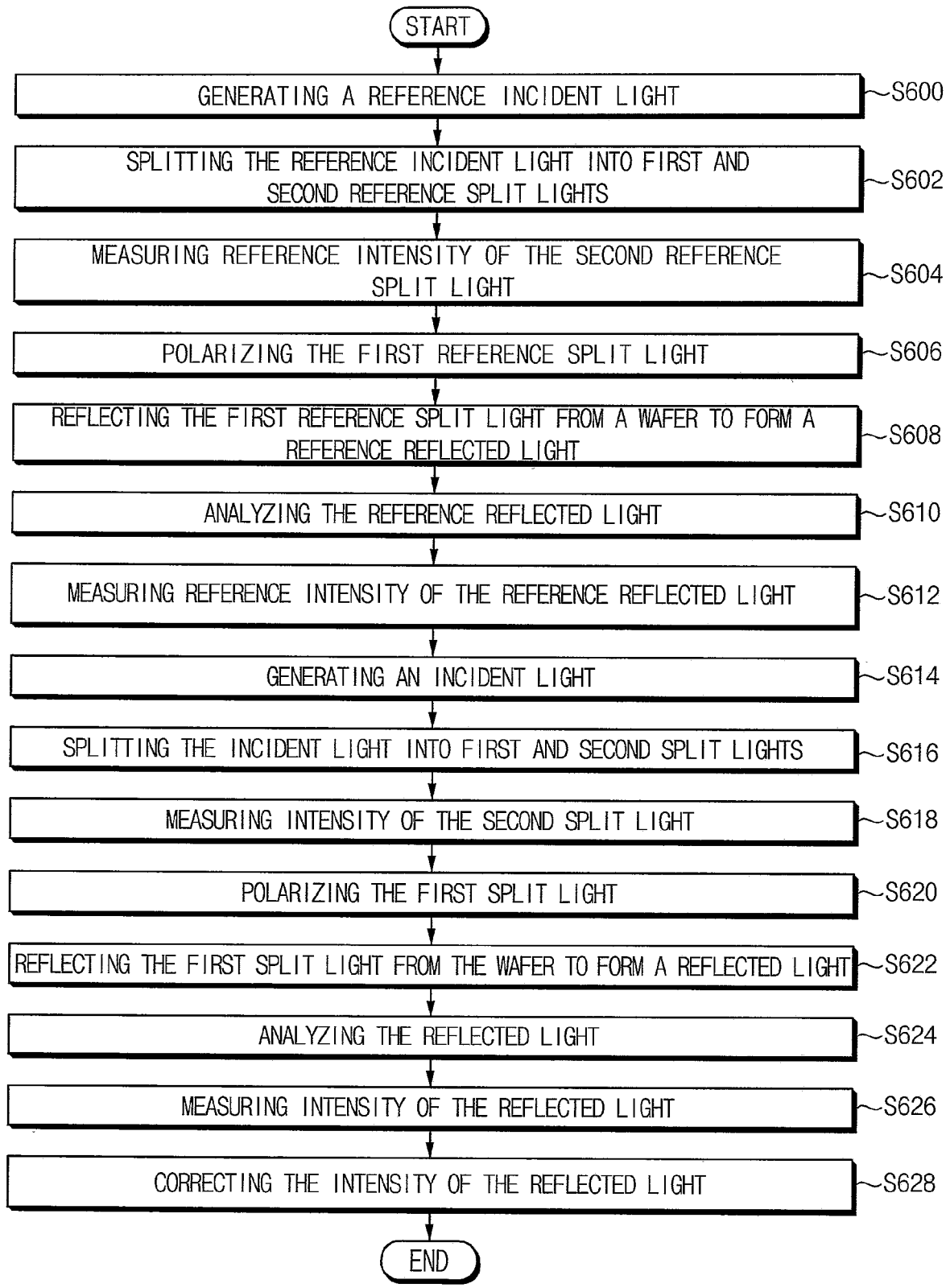

FIG. 6 is a flow chart illustrating a method of inspecting a wafer using the apparatus in FIG. 5.

Referring to FIGS. 5 and 6, in step S600, the light source 310 may generate the reference incident light having a reference intensity. The reference incident light may have a single wavelength.

In step S602, the beam splitter 330 may split the reference incident light into a first reference split light and a second reference split light. The first reference split light may be incident to the PSG 320. The second reference split light may be incident to the first calibrator 342.

In step S604, the first calibrator 342 may measure a reference intensity of the second reference split light. The reference intensity of the second reference split light measured by the first calibrator 342 may then be transmitted to the corrector 370.

In step S606, the PSG 320 may polarize the first reference incident light to provide the first reference incident light with optical characteristics coincided with the inspection conditions of the wafer W.

In step S608, the first reference split light may be incident to the wafer W. The first reference split light may be reflected from the wafer W to form the reference reflected light. The reference reflected light may have the reference intensity.

In step S610, the PSA 350 may analyze the reference reflected light.

In step S612, the second calibrator 362 may measure the reference intensity of the reference reflected light. The measured reference intensity of the reference reflected light may then be transmitted to the corrector 370.

After a time elapse, the light source 310 may be fluctuated. In this case, in step S614, the light source 310 may generate the incident light I0'. The incident light I0' may have an intensity different from the reference intensity of the reflected incident light.

In step S616, the beam splitter 330 may split the incident light I0' into the first split light I1' and the second split light I2'. The first split light I1' may be incident to the PSG 320. The second split light I2' may be incident to the first calibrator 342.

In step S618, the first calibrator 342 may measure the intensity of the second split light I2'. The intensity of the second split light I2' measured by the first calibrator 342 may then be transmitted to the corrector 370.

In step S620, the PSG 320 may polarize the first incident light I1' to provide the first incident light I1' with optical characteristics coincided with the inspection conditions of the wafer W.

In step S622, the first split light I1' may be incident to the wafer W. The first split light I1' may be reflected from the wafer W to form the reflected light R'. The reflected light R' may have an intensity different from the reference intensity of the reference reflected light.

In step S624, the PSA 350 may analyze the reflected light R'.

In step S626, the second calibrator 362 may measure the intensity of the reflected light R'. The measured intensity of the reflected light R' may then be transmitted to the corrector 370.

In step S628, the corrector 370 may correct the intensity of the reflected light R' using the reference intensity of the reference incident light, the reference intensity of the reference reflected light, the intensity of the second split light I2' and the intensity of the reflected light R'. The correcting functions of the corrector 370 may be substantially the same as the correcting functions of the corrector 170 illustrated with reference to FIG. 2. Thus, any further illustrations with respect to the correcting functions of the corrector 370 may be omitted herein for brevity.

According to example embodiments, when the difference between the intensities of the incident light and the reference intensities of the reference light may be generated, the difference may mean that a fluctuation may be generated in the intensities of the incident light. The intensities of the reflected light may be corrected based on the difference to improve inspection reliability of the wafer.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A method of inspecting a wafer, the method comprising:
   generating a reference incident light including a plurality of wavelengths;
   measuring, by wavelength, an intensity of the reference incident light by the wavelengths and storing the measurement as stored reference incident light intensity;
   irradiating the reference incident light to the wafer;
   measuring, by wavelength, an intensity of a reference reflected light by the wavelengths and storing the measurement as stored reference reflected light intensity, the reference reflected light generated as a result of irradiating the reference incident light to the wafer;
   generating an incident light including the plurality of wavelengths;
   measuring, by wavelength, an intensity of the incident light and storing the measurement as stored incident light intensity;
   irradiating the incident light to the wafer;
   measuring, by wavelength, an intensity of a reflected light from the wafer and storing the measurement as stored reflected light intensity, the reflected light generated as a result of irradiating the incident light to the wafer;
   determining a difference, at individual wavelengths, between the stored reflected light intensity and the stored reference reflected light intensity; and
   correcting, by wavelength, the stored reflected light intensity based on the determined difference,
   wherein there is a time lapse between when the stored reference reflected light intensity is measured and when the stored reflected light intensity is measured.

2. The method of claim 1, wherein measuring the intensities of the incident light by the wavelengths comprises:
   splitting the incident light;
   dividing the split incident light by the wavelengths; and
   measuring intensities of the divided incident light by the wavelengths.

3. The method of claim 2, wherein measuring the intensities of the reflected light by the wavelengths comprises:
   dividing the reflected light by the wavelengths; and
   measuring intensities of the divided reflected light by the wavelengths.

4. The method of claim 1, wherein measuring the intensities of the incident light by the wavelengths comprises:
   dividing the incident light by the wavelengths;
   splitting the divided incident light; and
   measuring intensities of the split incident light by the wavelengths.

5. The method of claim 4, wherein measuring the intensities of the reflected light by the wavelengths comprises:
   irradiating the split incident light to the wafer; and
   measuring intensities of the reflected light, from the wafer, by the wavelengths.

6. The method of claim 1, wherein correcting the stored reflected light intensity comprises:
   adding, by wavelength, the stored reflected light intensity to the difference between the stored reflected light intensity and the stored reference reflected light intensity.

7. The method of claim 6, wherein obtaining the difference between the stored reflected light intensity and the stored reference reflected light intensity comprises:
obtaining a difference between the stored incident light intensity and the stored reference incident light intensity;
obtaining a ratio of the stored reflected light intensity with respect to the stored incident light intensity; and
multiplying the ratio by the difference between the stored incident light intensity and the stored reference incident light intensity.

8. The method of claim 1, further comprising polarizing the incident light.

9. The method of claim 1, further comprising analyzing the reflected light.

10. A method of inspecting a wafer, the method comprising:
generating a reference incident light including a plurality of wavelengths;
measuring, by wavelength, an intensity of the reference incident light by the wavelengths and storing the measurement as stored reference incident light intensity;
irradiating the reference incident light to the wafer;
measuring, by wavelength, an intensity of a reference reflected light by the wavelengths and storing the measurement as stored reference reflected light intensity, the reference reflected light generated as a result of irradiating the reference incident light to the wafer;
generating an incident light including the plurality of wavelengths;
measuring, by wavelength, an intensity of the incident light and storing the measurement as stored incident light intensity;
polarizing the incident light;
irradiating the polarized incident light to the wafer;
measuring, by wavelength, an intensity of a reflected light from the wafer and storing the measurement as stored reflected light intensity, the reflected light generated as a result of irradiating the polarized incident light to the wafer;
determining a difference, at individual wavelengths, between the stored reflected light intensity and the stored reference reflected light intensity; and
correcting, by wavelength, the stored reflected light intensity based on the determined difference, at individual wavelengths,
wherein there is a time lapse between when the stored reference reflected light intensity is measured and when the stored reflected light intensity is measured.

11. The method of claim 10, wherein measuring the intensities of the incident light by the wavelengths comprises:
splitting the incident light;
dividing the split incident light by the wavelengths; and
measuring intensities of the divided incident light by the wavelengths.

12. The method of claim 11, wherein measuring the intensities of the reflected light by the wavelengths comprises:
dividing the reflected light by the wavelengths; and
measuring intensities of the divided reflected light by the wavelengths.

13. The method of claim 10, wherein measuring the intensities of the incident light by the wavelengths comprises:
dividing the incident light by the wavelengths;
splitting the divided incident light; and
measuring intensities of the split incident light by the wavelengths.

14. The method of claim 13, wherein measuring the intensities of the reflected light by the wavelengths comprises:
irradiating the split incident light to the wafer; and
measuring intensities of the reflected light, from the wafer, by the wavelengths.

15. The method of claim 10, wherein correcting the stored reflected light intensity comprises:
adding, by wavelength, the stored reflected light intensity to the difference between the stored reflected light intensity and the stored reference reflected light intensity.

16. The method of claim 15, wherein obtaining the difference between the stored reflected light intensity and the stored reference reflected light intensity comprises:
obtaining a difference between the stored incident light intensity and the stored reference incident light intensity;
obtaining a ratio of the stored reflected light intensity with respect to the stored incident light intensity; and
multiplying the ratio by the difference between the stored incident light intensity and the stored reference incident light intensity.

17. The method of claim 10, further comprising analyzing the reflected light.

* * * * *